(12) United States Patent  (10) Patent No.: US 8,434,981 B2
Bösterling et al.  (45) Date of Patent: May 7, 2013

(54) SCREW ANCHOR WITH CONICAL HEAD FOR RAIL ATTACHMENT

(75) Inventors: Winfried Bösterling, Neuenrade (DE); André Hunold, Iserlohn (DE); Eugen Gart, Lüdenscheid (DE)

(73) Assignee: Vossloh Werke GmbH, Werdohl (DE)

( * ) Notice: Subject to any disclaimer, the term of this patent is extended or adjusted under 35 U.S.C. 154(b) by 189 days.

(21) Appl. No.: 13/133,450

(22) PCT Filed: Dec. 10, 2009

(86) PCT No.: PCT/EP2009/066825
§ 371 (c)(1),
(2), (4) Date: Jul. 14, 2011

(87) PCT Pub. No.: WO2010/066837
PCT Pub. Date: Jun. 17, 2010

(65) Prior Publication Data
US 2011/0262241 A1    Oct. 27, 2011

(30) Foreign Application Priority Data
Dec. 10, 2008 (EP) .................................. 08021460

(51) Int. Cl.
*F16B 37/12*  (2006.01)
(52) U.S. Cl.
USPC ............... 411/178; 411/55; 238/315

(58) Field of Classification Search ............... 411/55, 411/103, 107, 108, 178; 238/315, 344
See application file for complete search history.

(56) References Cited

U.S. PATENT DOCUMENTS

| | | | | |
|---|---|---|---|---|
| 4,818,165 A | * | 4/1989 | Shirai | 411/178 |
| 4,906,151 A | * | 3/1990 | Kubis | 411/178 |
| 5,085,547 A | * | 2/1992 | Vanotti | 411/72 |
| 5,332,153 A | * | 7/1994 | Leibhard et al. | 238/373 |
| 5,788,440 A | * | 8/1998 | Andronica | 411/178 |

FOREIGN PATENT DOCUMENTS

| | | |
|---|---|---|
| EP | 0821103 | 1/1998 |
| GB | 865120 | 4/1961 |

* cited by examiner

*Primary Examiner* — Gary Estremsky
(74) *Attorney, Agent, or Firm* — Scott R. Cox

(57) ABSTRACT

A screw anchor for concrete attachment to a railroad tie or solid track comprises external threads (16) disposed on the exterior of the screw anchor (10) and internal threads (18) disposed inside the screw anchor (10) for force-fitted connecting to a fastening element (30), wherein the screw anchor (10) comprises two sections (12, 14) adjacent to one another in the longitudinal direction, the first section (12) having a substantially cylindrical external shape and the second section (14) having a substantially conical external shape, and wherein the second section (14) is disposed between the first section (12) and an inlet opening (26) for the fastening element (30).

11 Claims, 2 Drawing Sheets

SCREW ANCHOR WITH CONICAL HEAD FOR RAIL ATTACHMENT

FIELD OF THE INVENTION

The invention relates to a screw anchor according to the preamble to claim 1 for concrete attachment to a solid track or railroad tie and for force-fitted connecting to a fastening element. The invention further relates to this type of screw anchor with a screwed-in fastening element and a solid track or railroad tie with at least one screw anchor according to the invention.

PRIOR ART

Screw anchors for concrete attachment to a solid track or railroad tie are used in railway construction to connect a rail and a substructure in the form of a tie or a solid track. Here the rail is fastened to the substructure by means of tie screws. Screw anchors are generally made of plastic and can be cast integrally with a concrete tie or solid track when the latter is being produced. A further reason for providing a plastic anchor is that the tie screw should be electrically isolated from the tie or the solid track.

The disadvantage of conventional screw anchors/tie screw fastenings is that the latter are often not capable of transmitting sufficiently high lateral forces from the rail fastening into the tie.

DESCRIPTION OF THE INVENTION

The object forming the basis of the invention is to propose a screw anchor for concrete attachment to a railroad tie or solid track which can transmit increased lateral forces from the track fastening into the railroad tie or solid track. This object is achieved by a screw anchor having the features of claim 1. Preferred embodiments of the invention follow from the other claims.

According to the invention a screw anchor for concrete attachment to a railroad tie or solid track and for force-fitted connecting to a fastening element comprises external threads disposed on the exterior of the screw anchor and internal threads disposed inside the screw anchor. The screw anchor is characterized in that the latter comprises two sections adjacent to one another in the longitudinal direction, a first section having a substantially cylindrical external shape, and a second section having a substantially conical external shape. The second section is disposed here between the first section and an inlet opening for the fastening element. In other words, the screw anchor has a conical head towards the inlet opening, the advantage of which is that as the conical widening increases, the contact area between the anchor and the surrounding railroad tie or solid track increases, but on the other hand the cross-sectional area available for transmitting lateral forces also increases. In this way the surface pressure between the fastening element and the anchor can be reduced.

According to one preferred embodiment of the invention the internal thread is a trapezoidal thread. The advantage of a trapezoidal thread is that with a trapezoidal thread large forces can be transmitted and the thread grooves in the anchor have a blunt geometry with a groove base of the individual thread grooves arranged in the circumferential direction. On the other hand, with for example a thread with flanks of the internal thread running towards one another at an acute angle there is a risk that cracks running from the base of the groove of the thread grooves will continue into the material of the screw anchor.

Preferably the external thread is a round thread, by means of which the forces transmitted from the fastening element onto the anchor can be conveyed well into the surrounding material of the railroad tie or solid track.

According to one preferred embodiment the conical external shape of the second section has in certain areas at least one rib extending in the longitudinal direction of the screw anchor. Every rib acts here as a form-fitted element and serves to prevent undesirable turning of the screw anchor relative to the concrete tie or solid track, and this contributes to the functional reliability of the screw anchor and in addition increases the radial forces that can be transmitted from the screw anchor into the concrete tie or solid track. For the same reason the cylindrical external shape of the first section can also have in certain areas at least one rib extending in the longitudinal direction of the screw anchor.

The screw anchor with the screwed-in fastening element is characterized in that the second section with the conical external shape has a conical internal shape with straight flanks, the conical internal shape having dimensions such that the latter lies flat against an external cone of the fastening element. Matching the conical surfaces to one another as regards the dimensions and the angles serves to achieve contact over the largest area possible between the external cone of the fastening element and the conical internal shape of the anchor. This measure is also used to be able to transmit the highest possible forces from the fastening element via the anchor into the tie or solid track by means of contact over the largest area possible.

Preferably the fastening element has a screw-in thread which is screwed into the internal thread of the screw anchor, the internal thread of the screw anchor extending at least over part of the first section. In this way the thread pairing for fastening the fastening element in the anchor is placed in at least one part of the first section, whereas in the remaining part of the screw anchor there is no internal thread, and connection between the fastening element and the anchor over the largest area possible can be produced. The smaller the area of the thread connection between the fastening element and the screw anchor, the smaller the achievable extraction strength in the axial direction between the fastening element and the screw anchor. Conversely however, in the remaining area contact over the largest area possible can be generated in order to outperform high lateral forces.

The fastening element preferably has a cylindrical section to which the external cone adjoins. Since the screw-in thread of the fastening element extends over the whole cylindrical section and part of the external cone, a very high extraction strength between the fastening element and the screw anchor can be realized.

Preferably the fastening element is a screw or an anchor bolt which interact directly with further components in the track superstructure in order to constitute a fastening point for a railway track on a railroad tie or solid track.

BRIEF DESCRIPTION OF THE FIGURES

In the following the invention will be described, purely as an example, by means of the attached figures in which.

WAYS OF IMPLEMENTING THE INVENTION

Figure 1:
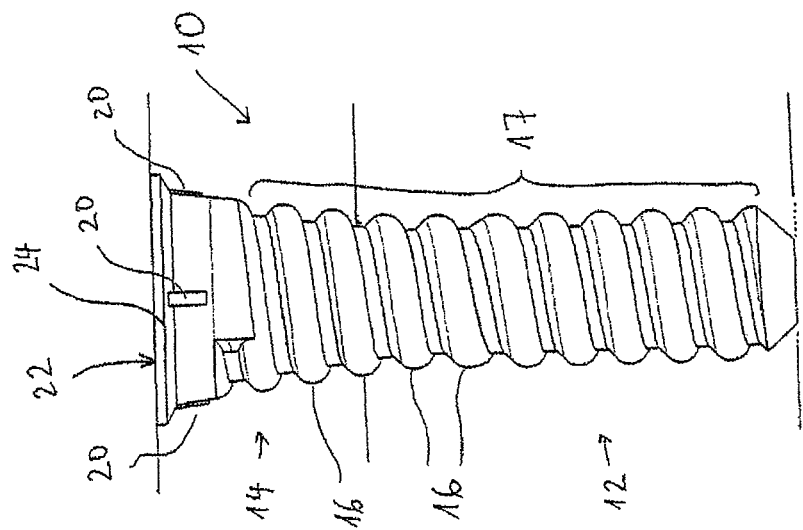
FIG. 1 shows a diagrammatic external view of the screw anchor according to the invention.
Figure 2:
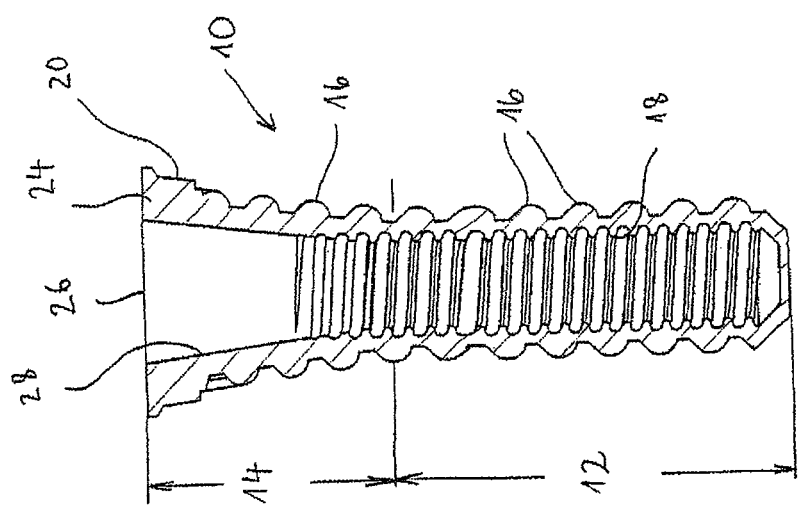
FIG. 2 shows a sectional view of the anchor shown in FIG. 1.

In the figures described below elements which are respectively the same are identified by the same reference numbers. The screw anchor 10 shown in FIGS. 1 and 2 is made of plastic material, preferably polyamide, and can be broken down into a number of sections, a cylindrical first section 12 and a conical second section 14. The term cylindrical section should be understood here to the effect that the external circumference of the anchor can be encased by a straight cylinder. Accordingly the conical second section 14 can substantially encased by a truncated cone with substantially straight flanks.

Both in the area of the first section 12 and of the second section 14 there are numerous threads 16 which are configured as round threads. Moreover, as can be seen in FIG. 2, there is provided in the interior of the screw anchor 10 an internal thread 18 which differs from the external thread as regards the thread shape and the thread pitch. In the embodiment according to FIGS. 1 and 2 the internal thread is in the form of a trapezoidal thread, the term "trapezoidal thread" identifying the form in principle of a conventional trapezoidal thread, but is not supposed to identify the exact geometry according to the standards. In comparison with the threads 16 of the external thread, the internal thread 18 has a clearly smaller pitch and consequently a larger contact area between the screw anchor and a corresponding fastening element 30, which results in a high axial extraction force between the fastening element and the screw anchor.

There are disposed on the external circumference of the second section 14 a number of ribs 20 which extend in the longitudinal direction of the screw anchor 10 and directly adjoin a flange area 24 adjoining the upper end surface 22 of the anchor 10. In the present exemplary embodiment the ribs 20 have a substantially rectangular bar shape and, like the flange area 24, are also formed integrally with the material of the screw anchor 10, as can be seen from the sectional illustration in FIG. 2.

As can be seen in FIG. 2, the second section 14 adjoining the inlet opening 26 of the screw anchor has straight flanks 28 up to the start of the internal thread 18 which can come into total contact with a correspondingly formed external cone of a fastening element.

Figure 3:
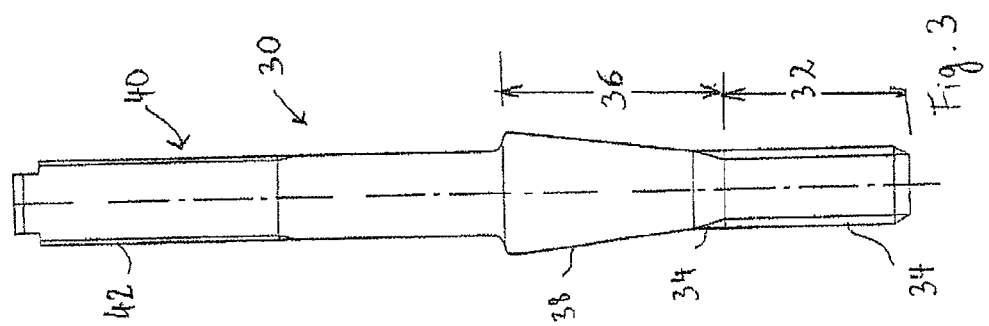
FIG. 3 an exemplary embodiment of a corresponding fastening element.

FIG. 3 shows an exemplary embodiment of a fastening element 30 to be used with the anchor according to the invention. The fastening element here is a screw with a first area 32 which is provided with a screw thread 34 corresponding to the internal thread of the anchor, and a second area 36 directly adjoining the first area 32 which is also provided in certain areas following the first region 32 with the screw thread 34. The second area 36 widens conically as the distance from the first area 32 increases, and has a level lateral area 38 and a cone angle which are matched to the internal cone of the anchor and the flanks 28. Adjoining the first area 32 and the second area 36 is the fastening area 40 used in the track superstructure and adapted to the special requirements in the track superstructure, and which in the embodiment shown in FIG. 3 is additionally provided with an external thread 42.

Figure 4:
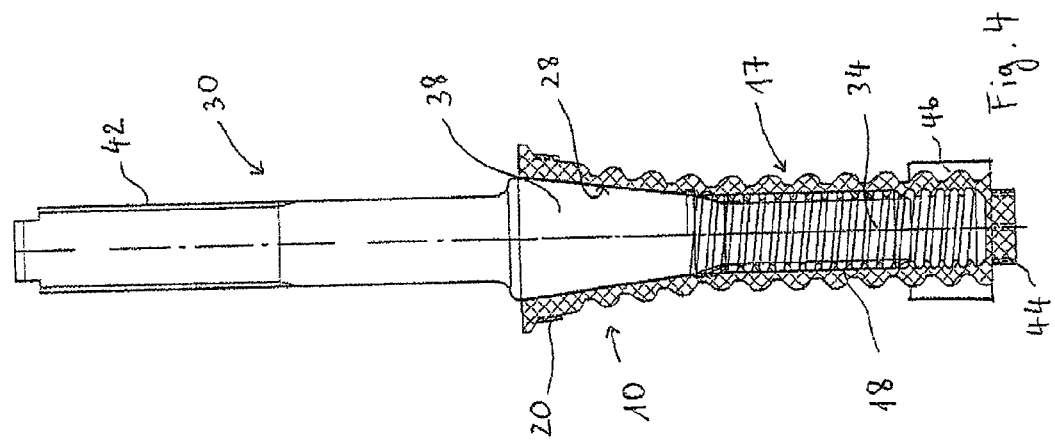
FIG. 4 a sectional view of a screw anchor according to FIGS. 1 and 2 which has been slightly modified with a screwed-in fastening element according to FIG. 3.

The structural unit comprising the screw anchor 10 and the fastening element 40 is shown in FIG. 4. As can be seen, the level lateral area 38 of the conical area of the fastening element 40 rests with its whole surface against the flanks 28 in the second section of the anchor. In the present exemplary embodiment the first region of the fastening element 30 does not extend to the lower end of the screw anchor designed to be closed at the bottom, the external geometry of which differs, moreover, from that of the embodiments according to FIGS. 1 and 2, as can be seen from the lower projection 44 of the screw anchor in comparison with the conical tip according to the embodiments of FIGS. 1 and 2.

Moreover, the screw anchor according to the embodiment of FIG. 4 has additional ribs 46 in the area of the first section of the screw anchor which also have the function of preventing turning of the screw anchor relative to the surrounding concrete material of the railroad tie or solid track.

It is common to all of the embodiments shown that the screw anchor 10 is provided with a conical head so that in interaction with a correspondingly shaped fastening element an increased bearing stress can be achieved, and so increased lateral forces can be transmitted from the rail fastening via the anchor into the railroad tie or solid track.

The invention claimed is:

1. A screw anchor for concrete attachment to a railroad tie or solid track and for force-fitted connecting to a fastening element comprising:
    an external thread disposed on an exterior of the screw anchor;
    an internal thread disposed inside the screw anchor;
    characterized in that
    the screw anchor comprises two sections adjacent to one another in a longitudinal direction,
    wherein a first section of the screw anchor has a substantially cylindrical external shape; and
    wherein a second section of the screw anchor has a substantially conical external shape;
    wherein the second section is disposed between the first section and an inlet opening for the fastening element and wherein the internal thread of the fastening element comprises a trapezoidal thread that has a smaller pitch than the external thread.

2. The screw anchor according to claim 1,
    characterized in that
    the external thread comprises a round thread.

3. The screw anchor according to claim 1,
    characterized in that
    the conical external shape of the second section comprises at least one rib extending in a longitudinal direction of the screw anchor.

4. The screw anchor according to claim 1,
    characterized in that
    the cylindrical external shape of the first section comprises at least one rib extending in a longitudinal direction of the screw anchor.

5. The screw anchor of claim 1,
    characterized in that
    the second section of the screw anchor with the conical external shape has a conical internal shape with straight flanks and has dimensions such that the conical internal shape lies flat against an external cone of the fastening element.

6. The screw anchor according to claim 5,
    characterized in that
    the fastening element has a screw-in thread which is screwed into the internal thread of the screw anchor, and wherein the internal thread of the screw anchor extends at least over part of the first section.

7. The screw anchor according to claim 6,
    characterized in that
    the fastening element has a cylindrical area which the external cone adjoins; and the screw-in thread of the fastening element extends over a cylindrical, first area and part of the external cone.

8. The screw anchor according to claim 5, characterized in that
the fastening element is a screw.

9. The screw anchor according to claim 5, characterized in that
the fastening element is an anchor bolt.

10. A railroad tie with at least one screw anchor according to claim 1.

11. A solid track with at least one screw anchor according to claim 1.

* * * * *